Patented Apr. 24, 1945

2,374,447

UNITED STATES PATENT OFFICE 2,374,447

STABLE NONVISCOUS METALLIC SOAP SOLUTIONS

Ralph E. Madison, Detroit, Mich., assignor to Truscon Laboratories, Inc., a corporation of Michigan No Drawing. Application July 11, 1942, Serial No. 450,634

3 Claims. (Cl. 106—243)

This invention relates to stable non-viscous solutions of metallic soaps of the class which gel in the presence of a hydrocarbon solvent and the method of manufacturing the same.

Heretofore, aluminum stearate and like solutions employed for such purposes as waterproofing have been produced by converting the aluminum stearate or other metallic soaps into a gel using any one or more of many different types of solvents such as petroleum hydrocarbons, coal tar and other aromatic hydrocarbons, turpentine, and the like. Such solutions are characterized as being a more or less viscous gel, the gel structure varying with the nature of the metallic soap and solvents selected and proportions thereof. Furthermore, such solutions are not stable and generally precipitate partially into their original constituents forming a sludge upon long standing.

One object of this invention is to provide highly concentrated stable aluminum stearate and like solutions having viscosities approximating the viscosity of water which, among many uses, may be more effectively employed in the waterproofing of masonry than prior art solutions because of their low viscosity and because of the presence in the low viscosity solutions of a greater concentration of high water repellent aluminum stearate soaps.

A further object of the invention is to provide a method of treating aluminum stearate and like gels to obtain maximum concentrated stable solutions having a minimum viscosity which are characterized by producing a high degree of water repellency when used as waterproofing for masonry.

Three examples of aluminum stearate solutions embodying the invention indicative of but not limiting the rather wide range of proportions and ingredients are as follows:

Example No. 1

| | | |
|---|---|---|
| Aluminum stearate | lbs | 28¼ |
| Mineral spirits (49° Baumé) | gal | 90 |
| Coal tar naphtha | gal | 14¼ |
| Butanol | gal | 4½ |
| White mineral oil* | gal | 2 |
| Hydrochloric acid (26° Baumé) | lb | 3/16 |

Example No. 2

| | | |
|---|---|---|
| Aluminum stearate | lbs | 221 |
| Solvent | gal | 238 |
| Butanol | gal | 4.95 |
| White mineral oil* | gal | 16 |
| Aqua ammonia (29° Baumé) | lbs | 10.5 |

Example No. 3

| | | |
|---|---|---|
| Aluminum stearate | lbs | 100 |
| Xylene | gal | 27¾ |
| Butanol | gal | 4.4 |
| 10% nitric acid | lbs | 2 |

In each instance, a gel is first prepared by stirring the stearate and solvents together in a suitable vessel until a uniform slurry is obtained. The slurry is then heated by any conventional method such as an open fire or steam jacket to a temperature preferably approximating 175° to 205° Fahrenheit during constant and vigorous agitation until a very thick almost transparent gel is obtained. After the gel has been formed, the alcohol is stirred into the mixture which results in producing a considerable decrease in the consistency of the gel, for example, to a syrupy consistency. At this point, the white mineral oil (*) is added only if the ultimate solution is to be used for waterproofing masonry surfaces, in which case, the white mineral oil serves to bind together the stearate particles upon evaporation of the solvents to present a transparent non-discoloring film rather than a white powdery deposit. The viscosity is then further reduced to that approximating water by adding the electrolyte. After the electrolyte is completely stirred into the mixture and the desired low consistency stable solution is obtained, the solution is allowed to cool.

The employment of the alcohol-electrolyte treatment of metallic soap gels into non-viscous solutions preferably produced in accordance with the method steps herein disclosed provides stable solutions of the class described having a viscosity approximating that of water. Thus, the solutions have a greater ability to penetrate the pores of masonry, and, as a result, are very effective when used as a waterproofing or moisture proofing. The relatively high concentration of metallic soap obtained in the low viscosity solutions embodying the invention produces added water repellency as compared to the water repellent effect of prior art more viscous and less concentrated solutions.

The amounts of alcohol and electrolyte employed will vary considerably depending upon the characteristics of the type of stearate used, certain stearates producing rather stiff gels and others do not. The particular accomplishment of the invention is to produce a stable metallic soap solution having a viscosity materially lower than could be obtained by using only solvents generally employed in the prior art such as petroleum hydrocarbons, coal tar hydrocarbons, and others.

The butanol or other alcohol employed is not a solvent for the stearate, and is employed and has value only in the reduction of the viscosity of the highly viscous gel. The electrolyte apparently acts as a peptizer or polarizer, and, in combination with the alcohol accomplishes the desired reduction in viscosity and assures stability of the solution obtained. Therefore, by employing the instant invention, highly concentrated stable metallic soap solutions can be produced which have a low viscosity and which are capable of ready and deep penetration into the pores of masonry to which they may be applied, thus obtaining a much more sure and effective waterproofing and dampproofing than heretofore possible.

It is to be understood that the invention is not limited to the precise formulae and ingredients given for illustrative purpose herein, and that any desired hydrocarbon solvent known in the art such as mineral spirits, coal tar solvents, V. M. P. naphtha, turpentine, xylene, or the like, and mixtures of the same may be used to gel the aluminum stearate or other metallic soaps employed.

The term "aluminum stearate" as herein employed is intended to include any and all of the aluminum or other metallic soaps which gel in the presence of hydrocarbon solvents.

Although butanol is the only alcohol heretofore referred to, it is to be understood that other saturated aliphatic monohydric alcohols including and below amyl alcohol, such as ethyl, propyl, or butyl alcohol and their respective isomers, or any mixture thereof, may be employed in place thereof.

Because of the fact that aluminum stearate and other metallic soaps which gel in the presence of hydrocarbon solvents vary in their gelling characteristics, solvents from 2 to 25 times the weight of the metallic soap may be required to obtain gels which lend themselves readily to the herein disclosed alcohol-electrolyte treatment to produce the desired low viscosity and high metallic soap content solutions.

The term "electrolyte" as herein employed is intended to include concentrated hydrochloric acid, dilute nitric acid and concentrated aqua ammonia.

For gels produced from various types of metallic soaps and solvents, the alcohol-electrolyte ratio and amounts employed vary widely within the ranges indicated by the several examples which, stated in percentages, are from 15% to 100% of alcohol by weight of the metallic soap and from 1% to 5% of electrolyte by weight of the metallic soap.

Although but several illustrative examples of the invention and a single exposition of the method steps employed to produce improved and highly concentrated stable solutions embodying the invention have been given herein, it is to be understood that the invention herein shall be deemed that defined by the appended claims construed together with the specification in its broad rather than limiting sense.

I claim:

1. The method of manufacturing stable nonviscous solutions of the class described comprising the steps of forming a slurry of a metallic soap which will gel in the presence of a hydrocarbon solvent and a hydrocarbon solvent, gelating the said slurry by slowly raising the temperature thereof during agitation to 175° to 205° F., and reducing the viscosity of the gel by adding a saturated aliphatic monohydric alcohol no higher than amyl alcohol sufficient to reduce the gel to a syrupy consistency, and adding an acid selected from a class consisting of concentrated hydrochloric acid and dilute nitric acid in quantities not greatly in excess of that sufficient to reduce the said syrupy liquid to approximate the fluidity of water.

2. The method of manufacturing stable nonviscous solutions of the class described comprising the steps of forming a slurry of a metallic soap which will gel in the presence of a hydrocarbon solvent and a hydrocarbon solvent, gelating the said slurry by slowly raising the temperature thereof during agitation to 175° to 205° F., and reducing the viscosity of the gel by adding a saturated aliphatic monohydric alcohol no higher than amyl alcohol sufficient to reduce the gel to a syrupy consistency, and adding 1% to 5% of an acid selected from the class consisting of concentrated hydrochloric acid and dilute nitric acid by weight of the metallic soap to reduce the said syrupy liquid to approximate the fluidity of water.

3. The method of manufacturing stable nonviscous solutions of the class described comprising the steps of forming a slurry of a metallic soap which will gel in the presence of a hydrocarbon solvent and a hydrocarbon solvent, gelating the said slurry by slowly raising the temperature thereof during agitation to 175° to 205° F., reducing the viscosity of the gel to a syrupy consistency by adding 10% to 100% of a saturated aliphatic monohydric alcohol no higher than amyl alcohol by weight of the metallic soap, and adding from 1% to 5% of an acid selected from the class consisting of concentrated hydrochloric acid and dilute nitric acid by weight of the metallic soap to reduce the syrupy liquid to the approximate fluidity of water.

RALPH E. MADISON.